US010021970B2

(12) United States Patent
Lu et al.

(10) Patent No.: US 10,021,970 B2
(45) Date of Patent: Jul. 17, 2018

(54) AIRCRAFT AIR CHILLER WITH REDUCED PROFILE

(71) Applicant: B/E Aerospace, Inc., Wellington, FL (US)

(72) Inventors: Qiao Lu, Placentia, CA (US); William J. Godecker, Irvine, CA (US); James R. Forbes, Anaheim, CA (US)

(73) Assignee: B/E Aerospace, Inc., Wellington, FL (US)

( * ) Notice: Subject to any disclaimer, the term of this patent is extended or adjusted under 35 U.S.C. 154(b) by 219 days.

(21) Appl. No.: 14/502,930

(22) Filed: Sep. 30, 2014

(65) Prior Publication Data

US 2015/0089970 A1 Apr. 2, 2015

Related U.S. Application Data

(60) Provisional application No. 61/885,388, filed on Oct. 1, 2013.

(51) Int. Cl.
F25B 1/00 (2006.01)
F25D 17/00 (2006.01)
F25B 39/02 (2006.01)
A47B 31/02 (2006.01)
F25B 25/00 (2006.01)
(Continued)

(52) U.S. Cl.
CPC .............. A47B 31/02 (2013.01); B64D 11/04 (2013.01); F25B 1/005 (2013.01); F25B 25/005 (2013.01); F25D 11/003 (2013.01); F25D 17/067 (2013.01); B64D 2013/0629 (2013.01); Y02T 50/46 (2013.01)

(58) Field of Classification Search
CPC .............. A47B 31/02; B64D 11/04; B64D 2013/0629; B64D 11/0007; F25B 1/005; F25B 25/005; F25B 29/003; F25D 11/003; F25D 17/067; F25D 19/02
USPC ......... 62/419, 457.9, 115, 237, 513
See application file for complete search history.

(56) References Cited

U.S. PATENT DOCUMENTS 1,823,124 A * 9/1931 Replogle ............... F25B 1/005
62/180
3,507,322 A * 4/1970 Reed ..................... F16L 37/56
165/104.31
(Continued)

FOREIGN PATENT DOCUMENTS

JP 2000039246 A 2/2000
JP 2003240406 A 8/2003
JP 2007537077 A 12/2007

OTHER PUBLICATIONS

International Search Report, 3 pages, Feb. 23, 2015, from PCT/US2014/058596 published as WO 2015/050971 dated Apr. 9, 2015.

Primary Examiner — Henry Crenshaw
(74) Attorney, Agent, or Firm — Donna P. Suchy

(57) ABSTRACT

An improved aircraft air chiller unit particularly suited for an aircraft galley that requires refrigerated or cooled beverage/meal carts and/or chilled storage compartments. The chiller of the present invention takes the form of a line replaceable unit ("LRU") and incorporates a liquid-cooled refrigerant vapor compression cycle, arranged in a housing with a vertical orientation. Because of the vertical orientation, ducting on the rear surface of the chiller is omitted, reducing the overall footprint.

7 Claims, 4 Drawing Sheets

(51) Int. Cl.
*B64D 11/04* (2006.01)
*F25D 11/00* (2006.01)
*F25D 17/06* (2006.01)
*B64D 13/06* (2006.01)

(56) References Cited

U.S. PATENT DOCUMENTS

| | | | | |
|---|---|---|---|---|
| 3,692,100 | A | * | 9/1972 | Gallagher, Jr. ...... B65D 88/745 165/256 |
| 5,404,935 | A | * | 4/1995 | Liebermann ............. A21B 1/10 165/48.1 |
| 5,839,295 | A | * | 11/1998 | Lehmann .............. F25B 39/022 62/295 |
| 2002/0007637 | A1 | * | 1/2002 | Simmons ................. F25B 9/14 62/6 |
| 2005/0034477 | A1 | * | 2/2005 | Hu ........................ B64D 13/00 62/435 |
| 2005/0210910 | A1 | * | 9/2005 | Rigney .............. B60H 1/00014 62/407 |
| 2006/0054741 | A1 | * | 3/2006 | Mills ...................... B64D 11/00 244/118.5 |
| 2008/0087039 | A1 | * | 4/2008 | Reed ...................... B64D 11/02 62/498 |
| 2008/0196877 | A1 | * | 8/2008 | Zeigler ............. B60H 1/00907 165/202 |
| 2009/0107163 | A1 | * | 4/2009 | Lu ........................... F25D 17/06 62/291 |
| 2010/0071384 | A1 | * | 3/2010 | Lu ...................... B60H 1/00592 62/3.2 |
| 2010/0133290 | A1 | * | 6/2010 | Luntz ..................... F25D 19/02 221/97 |
| 2010/0224726 | A1 | * | 9/2010 | Lu ........................... F25D 17/06 244/118.5 |
| 2013/0047657 | A1 | * | 2/2013 | Oswald ................... B64D 11/04 62/407 |

* cited by examiner

AIRCRAFT AIR CHILLER WITH REDUCED PROFILE

CROSS-REFERENCES TO RELATED APPLICATIONS

This application claims priority from U.S. Provisional Patent Application No. 61/885,388, filed Oct. 1, 2013, the content of which is incorporated herein by reference in its entirety.

BACKGROUND

It is customary in the airline industry to provide food and beverages on flights to the passengers as well as the crew. Depending upon the duration of the flight, the service can be as little as beverages and a light snack to multiple meals for longer flights. To store, prepare, and serve food and beverages on an aircraft requires that provisions be made to the aircraft to safely maintain the food and drinks in a proper manner. For perishables, that means preserving the food and drinks in an environment that will keep the products fresh and viable. In most cases, this means a refrigeration system that can store and chill food and beverages until they are ready to be served to the passengers.

Large commercial passenger carrying airplanes predominantly utilize one of two cooling systems for maintaining perishable food stuffs and non-perishable beverages at their optimum temperatures. Chilling is necessary to preserve perishables and make certain beverages and foods more palatable, especially during long haul and ultra-long haul aircraft journeys. The first cooling system utilizes a standard vapor cycle based air chiller that utilizes conventional refrigerant vapor compression and expansion technology to generate a secondary re-circulated chilled air loop. The chilled air is generally supplied and returned via thermally insulated air ducting to and from a suitable storage structure, such as a galley. The air chiller may be located in the galley, or mounted proximally in another part of the aircraft airframe.

The second type of cooling system utilizes the same conventional refrigerant vapor compression and expansion technology, but the cooling medium is a chilled liquid rather than a air. Chilled liquid has a higher thermal capacity but requires more sophisticated pumping and conduit architecture to operate the system. The chilled liquid is pumped in a closed loop to and from a suitable storage structure such as a galley. The chilled liquid in some cases is configured to serve a large centralized system for the whole aircraft. In other cases, the chilled liquid can be circulated at each separate galley compartment to form a local area chilling loop, or be based on each individual galley as a standalone system. At the galley, the liquid is passed via a control valve and electronic control system to a heat exchanger, where an electric axial (or other) fan blows or sucks air through its matrix and to the storage compartment that requires chilling, such as, for example, a galley cart bay or refrigeration compartment. The heat exchanger fan and its control system (though not necessarily all) are grouped together to form a chilled air recirculation unit that may be fitted in or on the galley or remotely from it, or the galley complex.

One drawback of these various chiller systems is that they take up a large percentage of available space in the galley, which is at a premium in an aircraft for obvious reasons. Further, the chillers tend to be very heavy, which is also a drawback to their use on aircraft. There are also issues with condensation collection and removal, and the need for improvements in heat transfer efficiency. Accordingly, it would be beneficial to have a chiller system that takes up less space and reflects a reduction in weight over conventional chiller systems currently in use, while providing for condensation collection and improved heat transfer efficiency.

SUMMARY OF THE INVENTION

The present invention is an improved aircraft air chiller unit that weighs less than its counterparts and has a reduced overall foot print. This compact system is particularly suited for an aircraft galley that requires refrigerated or cooled beverage/meal carts and/or chilled storage compartments. The present invention is also particularly useful for large single aisle aircraft galleys and point of use (POU) carts. The chiller of the present invention is seated in a cavity created at the side of the galley compartment below the work deck of the aircraft galley. In a preferred embodiment, the chiller takes the form of a line replaceable unit ("LRU"), in other words a component that can be replaced in the field. The chiller incorporates a liquid-cooled refrigerant vapor compression cycle, arranged in a housing with a vertical orientation. A plurality of axial fans along an upper surface draw air into the unit, where it is introduced into a refrigerant vapor compression cycle. The axial fans can, in an alternate embodiment, be replaced with scroll type fans. The vapor cycle includes an evaporator, an expansion valve, a liquid cooled condenser, and a compressor in a compact, vertical arrangement. The chilled air re-circulates from the top of the unit to the bottom of the unit, eliminating the need for an air duct at the rear of the chiller. The elimination of the air duct reduces the required depth of the chiller compartment by at least four inches, which represents a significant space savings over existing chiller units. The chiller preferably utilizes quick disconnect valves for the condenser cooling liquid inlet and the outlet, which in turn is coupled to the aircraft heat sink. A display is provided on the unit for controlling the temperature and other operations of the unit.

The location of the chiller plays a role in both the galley foot print and weight reduction, as well as the efficient distribution of chilled air around the below work deck installed trolley or cart.

Other features and advantages of the present invention will become more apparent from the following detailed description of the preferred embodiments in conjunction with the accompanying drawings, which illustrate by way of example the operation of the invention

DETAILED DESCRIPTION OF THE PREFERRED EMBODIMENTS

Figure 1:
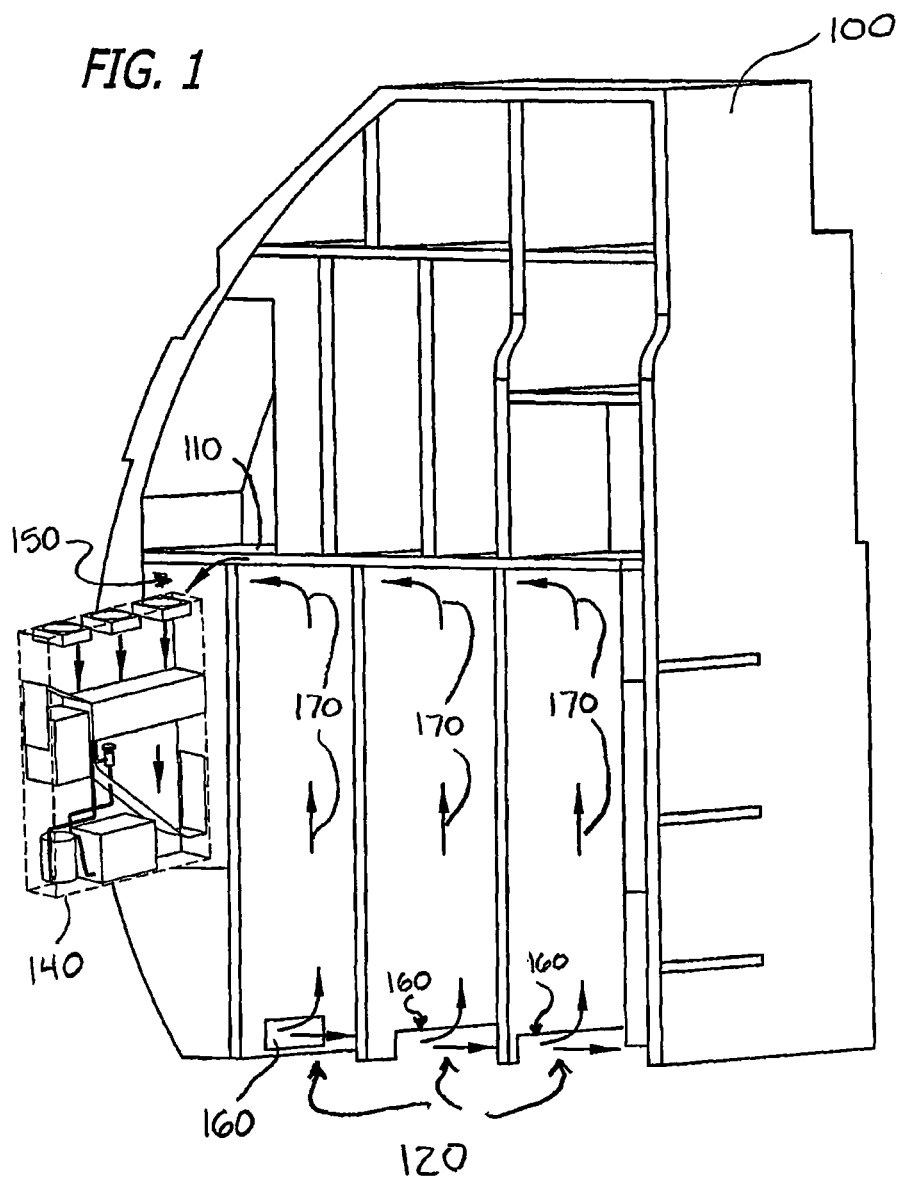
FIG. 1 is a perspective view of an aircraft galley structure illustrating a possible location for the chiller of the present invention.

FIG. 1 illustrates a portion of an aircraft galley structural framework showing a position of the new chiller unit in relation to the beverage cart bays. The galley framework 100 includes a plurality of compartments above a work deck 110, where the space above the work deck 110 is reserved for various food service equipment such as coffee brewers, refrigerators, food storage, utensil storage, and the like. Below the work deck 110 is a series of bays 120 for housing beverage carts (not shown) that the flight attendants push down the aircraft's aisle(s) to bring food and beverages to the passengers. The beverage carts are intended to be kept at a temperature that allows the beverages and perishables inside to be preserved and served at an acceptable temperature. To maintain the carts at the proper temperature, a chiller unit 140 is located in a designated peripheral compartment 150 with air passages above and below for directing and receiving air from the bays 120. Each bay 120 includes openings 160 along the bottom edge where chilled air can pass through from adjacent bays or, in the case of the first bay, from the compartment 150. Air flows in each bay as shown by arrows 170 around the bay, and back toward the peripheral compartment 150 as it warms. From the top of compartment 150, the air is drawn back into the chiller 140 where it is cooled and recirculated. The compact nature of the chiller 140 and its vertical orientation allows the unit to be stored in a designated peripheral compartment 150 adjacent the bays 120. Moreover, as explained below, the elimination of tubing at the rear surface of the chiller 140 reduces the necessary depth of the compartment 150 by at least four inches.

Figure 2:
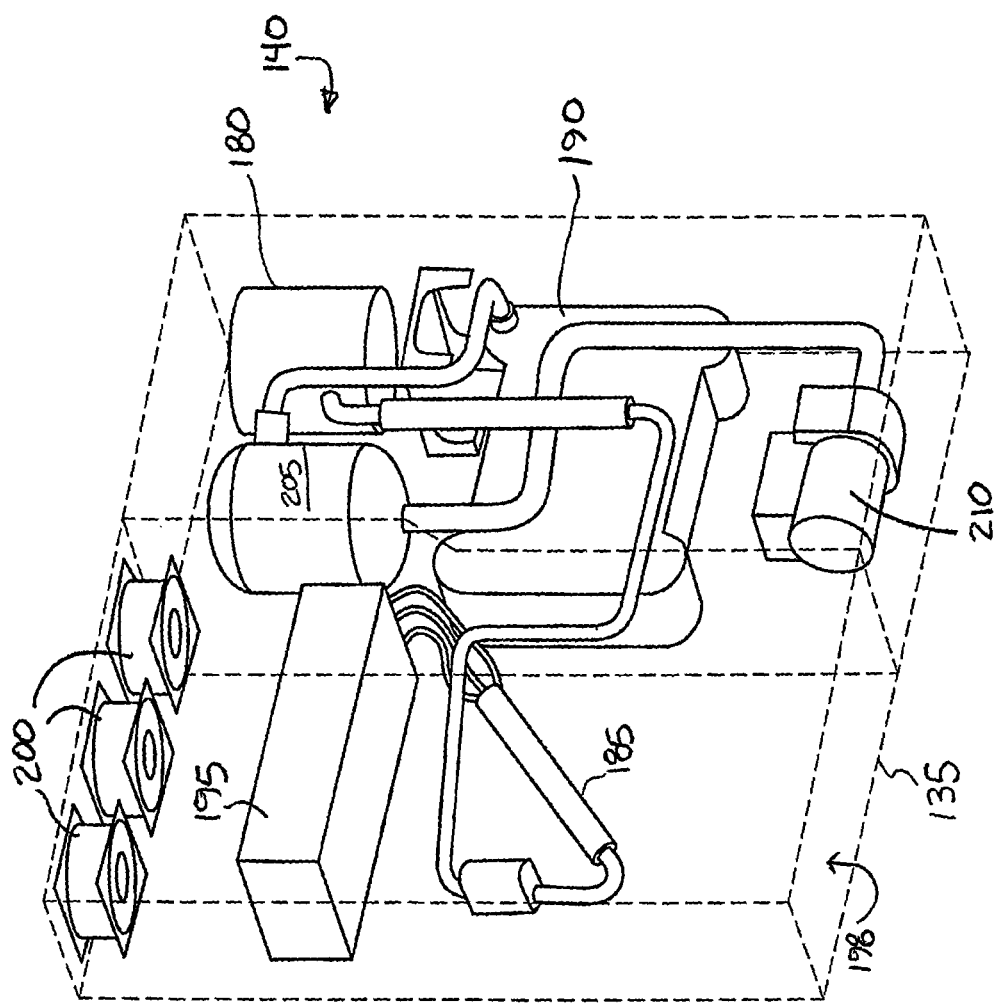
FIG. 2 is an elevated, perspective view of the components of a first embodiment of the chiller of the present invention.
Figure 3:
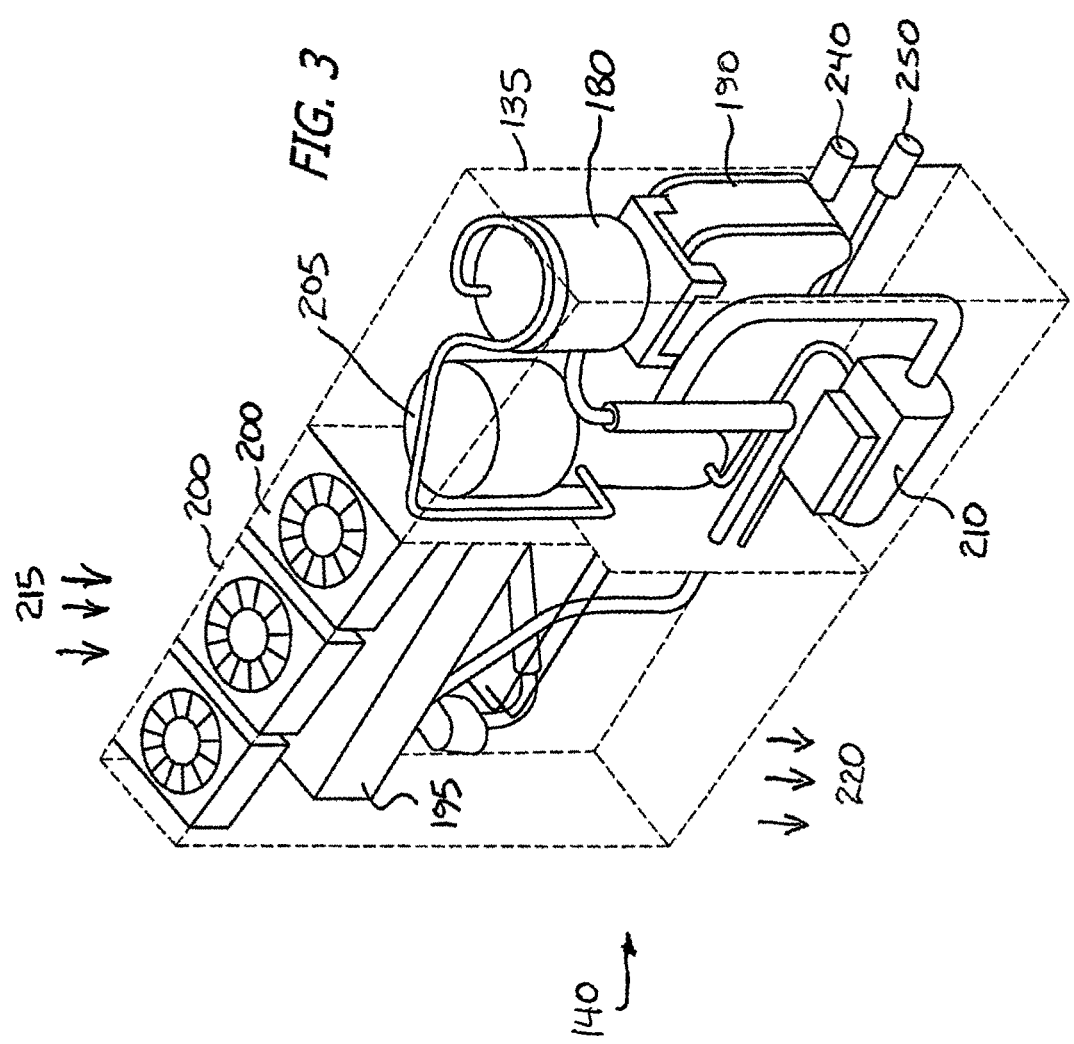
FIG. 3 is a perspective view of the elements of the chiller unit.

FIGS. 2 and 3 illustrate a chiller unit 140 that is particularly suited for the galley of a commercial aircraft, as set forth below. The chiller 140 is formed within a housing 135 and includes the basics of a vapor cycle refrigeration system, including a compressor 180, a heat exchanger 185, a liquid cooled condenser 190, and an evaporator 195. Warm air 215 enters through the top of the chiller 140, and cooled air 220 exits the chiller through the bottom opening 198 where it is directed to the bays 120 below the galley work deck 110. Circulating air 215 is delivered by the axial fan 200 through the evaporator 195 and bottom opening 198 as part of the air cooling process. A liquid cooling system for liquid-cooled condenser is employed circulating a coolant, such as propylene glycol water ("PGW"), which is passed through a liquid cooled condenser 190 and into a liquid reservoir 205 where it is collected. The PGW is then pumped by a liquid pump 210 via fluid quick disconnect 250 to a heat sink in the aircraft, where the PGW was cooled by cooling medium (air or liquid). The cooled PGW is then passed through another fluid quick disconnect 240 flow back into the condenser 190 to cool the superheated vapor of the refrigerant from the compressor 180.

Figure 4:
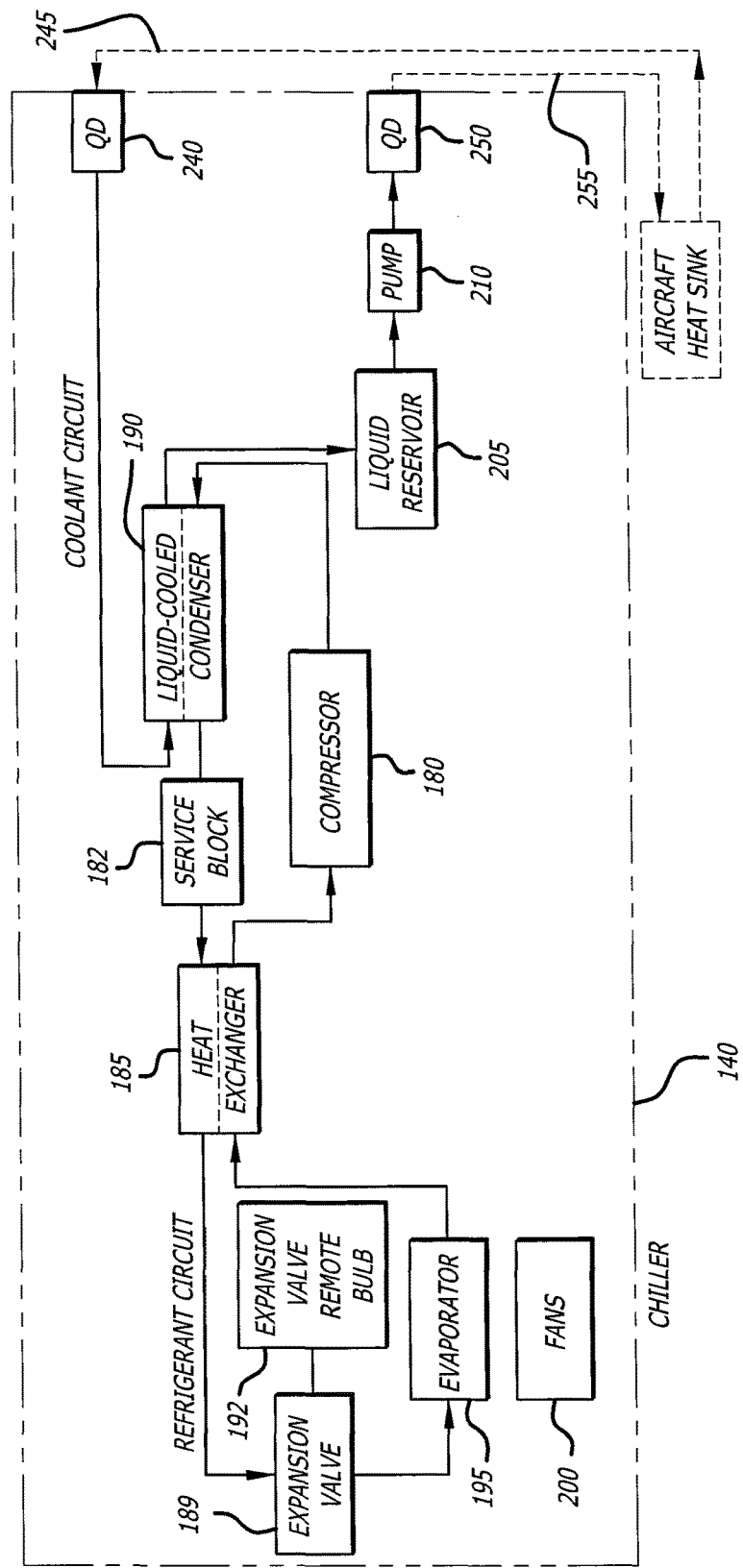
FIG. 4 is a schematic diagram of the system of FIGS. 2 and 3.

FIGS. 3 and 4 further illustrates the path of the refrigerant and chilled air. Circulating refrigerant (e.g., R134a, R1234yf, or other refrigerants) enters the compressor 180 in the thermodynamic state known as a low pressure superheated vapor and is compressed to a higher pressure, resulting in a higher temperature as well. The hot, compressed vapor is then in the thermodynamic state known as a superheated vapor with higher pressure and temperature, and it is at a temperature and pressure at which it can be condensed with either cooling liquid or cooling air. This hot vapor is routed through the condenser 190 where it is cooled and condensed into a liquid by flowing through a coil or tubes with cool liquid or cool air directed across outside the coil or tubes. This is where the circulating refrigerant rejects heat from the system and the rejected heat is carried away by the circulating liquid or air. The now-cooled condensed liquid refrigerant, in the thermodynamic state known as saturated, passes through a service block 182 containing a sight glass (not shown) and a filter/drier assembly (not shown). The refrigerant then passes through a refrigerant heat exchanger 185 for sub-cooling, in which heat is exchanged between the refrigerant liquid passing from the service block 182 to the expansion valve 189 and the refrigerant vapor passing from the evaporator 195 to the compressor 180. In particular, the refrigerant heat exchanger 185 performs a refrigerant liquid sub-cooling and refrigerant vapor superheating process by which the liquid refrigerant passing from the service block 182 to the expansion valve 189 via the refrigerant heat exchanger 185 transfers heat to the vapor refrigerant passing from the evaporator 195 to the compressor 180. By superheating the refrigerant before entering the compressor 180, refrigerant liquid droplets may be prevented from entering the compressor 180.

The refrigerant is next routed through an expansion valve 189 where it undergoes an abrupt reduction in pressure. The pressure reduction results in the adiabatic flash evaporation of a part of the liquid refrigerant. The auto-refrigeration effect of the adiabatic flash evaporation lowers the temperature of the liquid and vapor refrigerant mixture to where it is colder than the ambient temperature in the galley beverage cart compartments 120. The cold liquid-vapor mixture is then routed through the coil or tubes in the evaporator 195. The fans 200 draw in the warmer air 215 from the galley compartment across the coil or tubes carrying the cold refrigerant liquid and vapor mixture with lower pressure. That warm air 215 evaporates the liquid part of the cold refrigerant mixture. As a result, the circulating air 215 as it passes through the evaporator 195 is cooled, and this cooled air is forced out of the chiller along the bottom opening 198 where it is carried into the adjacent beverage cart compartments 120. The evaporator 195 is where the circulating refrigerant absorbs and removes heat which is subsequently rejected in the condenser and transferred elsewhere by the liquid or air used in the condenser 190. The expansion valve 189 may also be coupled with a thermal expansion remote bulb 192. The remote bulb 192 may be coupled with the expansion valve 189 by a capillary tube that communicates a working gas between the expansion valve 189 and the remote bulb 192 for sensing a temperature of the refrigerant leaving the evaporator 195. Thus, the expansion valve 189 may serve as a thermostatic expansion valve and operate to control a flow of refrigerant into the evaporator 195 according to the temperature of the refrigerant leaving the evaporator 195. After the cold liquid/vapor mixture exits the expansion valve 189, the refrigerant moves through the refrigerant tubing and enters the evaporator 195.

To complete the refrigeration cycle, the refrigerant vapor from the evaporator 195 in its now saturated-vapor state is routed back into the compressor 180 through heat exchanger 185.

The chiller 140 preferably includes two fluid quick disconnects (QD) at the rear of the housing 135. The first disconnect 250 is coupled to a tubing 255 that delivers fluid to the aircraft heat sink from the chiller 140, and the second disconnect 240 supplies fluid via tubing 245 from the aircraft heat sink to the chiller 140. These quick disconnect valves 240 and 250 are used to deliver cooling liquid to the condenser and carry heated fluid to the aircraft heat sink.

The compact configuration of the chiller 140 makes it extremely suitable for aircraft utilization. The capacity to be stored in a small, adjacent compartment and provide chilled air to beverage trolley bays results in weight and energy savings, as well as space. In a preferred embodiment, the chiller unit 140 has a height of 31.5 inches with a trapezoidal profile including a base length of 8.7 inches and the opposite side having a length of 5.9 inches. The chiller has a depth of 34.3 inches in the preferred embodiment, allowing the chiller to fit inside a small compartment 150 adjacent the trolley bays 120. Also, the chiller 140 takes the form of a galley line replaceable unit, or LRU, enabling the chiller to be quickly and easily removed and replaced without disassembling the galley architecture, leading to simpler maintenance and less downtime during repair or replacement. Because the chiller of the present invention does not utilize ducting on the side or rear wall, the footprint of the chiller is reduced and no ducting is needed to deliver the chilled air. Therefore, the chiller can fit in a smaller compartment while serving the same size and number of cart bays.

The present invention serves to demonstrate an adjacent-the-bay, POU, chiller system for a beverage trolley bay of an aircraft galley. The system is effective at removal of condensate from the evaporator, and improves the overall heat transfer efficiency of the evaporator and the system in general.

We claim:

1. A liquid-cooled, vertically-oriented chiller adapted for cooling adjacent aircraft galley carts, comprising:
   (a) a housing having a length and height that is greater than a width, and characterized by an absence of ducting exterior to the housing;
   (b) a plurality of fans positioned in centered alignment in a top portion of the housing along at least a portion of the length of the housing and communicating with the exterior of the housing through openings in the top portion of the housing for drawing ambient air into the housing for chilling;
   (c) an evaporator positioned in the housing and extending along at least a portion of the length of the housing directly below and in lengthwise alignment with the plurality of fans for receiving the ambient air drawn into the housing by the plurality of fans and discharging air chilled by contact with evaporator coils of the evaporator as the air moves past the evaporator coils from the fans above the evaporator to below the evaporator and out of a bottom portion of the housing to the adjacent galley carts;
   (d) a vapor cycle refrigerant system positioned in the housing in circuit with the evaporator, the vapor cycle refrigerant system including a compressor, a heat exchanger, a condenser, a service block at least containing a filter/drier assembly, and an expansion valve, the vapor cycle refrigerant system configured to cycle warmed refrigerant from the evaporator to the condenser cooled by a coolant circuit such that the condenser is configured to cool and condense the refrigerant, wherein the condensed refrigerant is configured to pass through the service block and through the heat exchanger configured to exchange heat between the condensed refrigerant and vapor refrigerant passing through the heat exchanger from the evaporator such that heat exchanger is configured to superheat the vapor refrigerant before entering the compressor; and
   (e) the coolant circuit including the condenser, a liquid reservoir, and a liquid pump for pumping coolant through the coolant circuit, wherein the chiller components of paragraphs (b), (c) and (d) are adapted to fit within the housing, and the compressor and condenser are positioned in the housing in a laterally offset, non-airflow interference position in relation to the fans and evaporator to maximize flow of chilled air into the top portion of the housing and out of the bottom portion of the housing, wherein the heat exchanger is positioned below the evaporator and extends from the evaporator at an oblique angle towards the bottom portion of the housing.

2. A chiller according to claim 1, and including a quick connect/disconnect coolant tubing connection upstream of the condenser and a quick connect/disconnect coolant tubing connection downstream of the liquid refrigerant pump.

3. A chiller according to claim 1, wherein the housing is adapted to be positioned in a galley cart bay of an aircraft galley framework.

4. A chiller according to claim 1, wherein a first quick connect/disconnect connection is coupled to a coolant tubing that delivers coolant from the condenser to an aircraft heat sink exterior of the housing, and a second quick connect/disconnect connection coupled to a coolant tubing that delivers coolant from the aircraft heat sink to the condenser.

5. A chiller according to claim 1, in combination with an aircraft galley framework having a plurality of laterally-adjacent galley cart bays, at least one of which bays is adapted to receive the chiller.

6. A chiller according to claim 1, wherein the superheated vapor refrigerant prevents refrigerant droplets from entering the compressor.

7. A liquid-cooled, vertically-oriented chiller adapted for cooling adjacent aircraft galley carts, comprising:
   (a) a housing having a length and height that is greater than a width, and characterized by an absence of ducting exterior to the housing;
   (b) a plurality of fans positioned in centered alignment in a top portion of the housing along at least a portion of the length of the housing and communicating with the exterior of the housing through openings in the top portion of the housing for drawing ambient air into the housing for chilling;
   (c) an evaporator positioned in the housing and extending along at least a portion of the length of the housing directly below and in lengthwise alignment with the plurality of fans for receiving the ambient air drawn into the housing by the plurality of fans and discharging air chilled by contact with evaporator coils of the evaporator as the air moves past the evaporator coils from the fans above the evaporator to below the evaporator and out of a bottom portion of the housing to the adjacent galley carts;
   (d) a vapor cycle refrigerant system positioned in the housing in circuit with the evaporator, the vapor cycle refrigerant system including a compressor, a heat exchanger, a condenser, a service block at least containing a filter/drier assembly, and an expansion valve, the vapor cycle refrigerant system configured to cycle warmed refrigerant from the evaporator to the condenser cooled by a coolant circuit such that the condenser is configured to cool and condense the refrigerant, wherein the condensed refrigerant is configured to pass through the service block and through the heat exchanger configured to exchange heat between the condensed refrigerant and vapor refrigerant passing through the heat exchanger from the evaporator such that heat exchanger is configured to superheat the vapor refrigerant before entering the compressor; and
   (e) the coolant circuit including the condenser, a liquid reservoir, and a liquid pump for pumping coolant through the coolant circuit, wherein the chiller components of paragraphs (b), (c) and (d) are adapted to fit within the housing, and the compressor and condenser are positioned in the housing in a laterally offset, non-airflow interference position in relation to the fans and evaporator to maximize flow of chilled air into the top portion of the housing and out of the bottom portion of the housing, wherein a first quick connect/disconnect connection is coupled to a coolant tubing that delivers coolant from the condenser to an aircraft heat sink exterior of the housing, and a second quick connect/disconnect connection coupled to a coolant tubing that delivers coolant from the aircraft heat sink to the condenser, wherein the liquid-cooled, vertically-oriented chiller is in combination with an aircraft galley framework having a plurality of laterally-adjacent galley cart bays, at least one of which bays is adapted to receive the chiller, wherein the heat exchanger is positioned below the evaporator and extends from the evaporator at an oblique angle towards the bottom portion of the housing.

* * * * *